US007103906B1

(12) United States Patent
Katz et al.

(10) Patent No.: US 7,103,906 B1
(45) Date of Patent: Sep. 5, 2006

(54) USER CONTROLLED MULTI-DEVICE MEDIA-ON-DEMAND SYSTEM

(75) Inventors: Neil Katz, Parkland, FL (US); Bruce P. Semple, Potomac, MD (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 09/676,545

(22) Filed: Sep. 29, 2000

(51) Int. Cl.
 *H04N 7/173* (2006.01)
(52) U.S. Cl. .............................. 725/87; 725/88; 725/91; 725/92; 725/93; 725/98
(58) Field of Classification Search .................. 725/86, 725/87, 91, 93, 98, 92, 88, 101–103, 115, 725/116, 135, 146; 386/46, 68, 83
 See application file for complete search history.

(56) References Cited

U.S. PATENT DOCUMENTS

| 5,442,390 | A | * | 8/1995 | Hooper et al. ................. 725/90 |
| 5,453,779 | A | * | 9/1995 | Dan et al. ...................... 725/88 |
| 5,461,415 | A | * | 10/1995 | Wolf et al. .................... 725/88 |
| 5,528,513 | A | * | 6/1996 | Vaitzblit et al. ............. 718/103 |
| 5,557,724 | A | * | 9/1996 | Sampat et al. ................. 725/43 |
| 5,586,264 | A | * | 12/1996 | Belknap et al. .............. 725/115 |
| 5,761,417 | A | * | 6/1998 | Henley et al. ............... 709/231 |
| 6,049,831 | A | | 4/2000 | Gardell et al. .............. 709/236 |
| 6,483,986 | B1 | * | 11/2002 | Krapf .......................... 386/68 |
| 6,496,981 | B1 | * | 12/2002 | Wistendahl et al. ......... 725/112 |
| 2002/0088011 | A1 | * | 7/2002 | Lamkin et al. .............. 725/142 |

FOREIGN PATENT DOCUMENTS

| EP | 0 673 160 | 8/1998 |
| JP | 2000-004272 | 1/2000 |

\* cited by examiner

*Primary Examiner*—Kieu-Oanh Bui
(74) *Attorney, Agent, or Firm*—Akerman Senterfitt (57) ABSTRACT

A method for providing configurable access to media in a media-on-demand system also can include delivering the media to a first client device in a format compatible with the first client device; interrupting the delivery of the media; recording a bookmark specifying a position in the media where the interruption occurred; and resuming delivery of the media to a second client device, the resumed delivery beginning at a position in the media specified by the recorded bookmark. The method further can include identifying device properties for each of the first and second client devices; delivering the media to the first client device in a format compatible with the identified device properties for the first client device; and, delivering the media to the second client device in a format compatible with the identified device properties for the second client device.

11 Claims, 6 Drawing Sheets

USER CONTROLLED MULTI-DEVICE MEDIA-ON-DEMAND SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates to the field of multimedia transfer and control. More particularly, the instant invention relates to a method and apparatus for dynamically controlling and referencing digital media independent of the point of access.

2. Description of the Related Art

Users, both business and consumers, are increasingly becoming accustomed to having large amounts of digital data delivered from various media-on-demand (MOD) systems. The continuing evolution from narrowband to broadband networks has fueled a growing need for digital data delivery by facilitating the transmission of broadband data not only by wired means, but also by wireless means. For example, the Internet, with its myriad of text, audio and video content, and its omnipresent availability, can provide consumers with a wealth of information that is practically accessible from anywhere through numerous wired and wireless means. As networks which provide access to digital data continue to evolve, the networks improve their ability to more efficiently distribute and serve bandwidth demanding streaming audio and video content to consumers.

Various forms of wired access methodologies have been created to provide consumer access to the various broadband networks. For example, cable modem service provided by cable service operators can provide Local Area Network (LAN) type access speeds via the same coaxial cable that carries cable signals to the premises of a subscriber. The cable modems used in these systems can support transmission speeds on the order of several megabits per second depending upon whether the network is engineered to use a symmetrical or an asymmetrical topology. These systems are orders of magnitude faster than narrowband systems, which typically can provide transmission speeds ranging from 28 Kbps to 56 Kbps. Digital Subscriber Loop (DSL) technology also can provide broadband access to subscribers, albeit, through traditional Plain Old Telephone Service (POTS) copper twisted pair lines. DSL modems, although not as fast as cable modems today, are touted to provide downstream speeds approaching 2 Mbps and upstream speeds approaching 512 Kbps depending upon the underlying network implementation.

Several wireless access technologies have been used to provide broadband wireless access to consumers. For example, the Reunion Broadband Wireless Access (BWA) manufactured by Nortel Networks Corporation of Brampton, P.O. provides a digital point-to-multipoint technology operating at frequencies ranging from 24 GHz to 38 Ghz. Additionally, Bluetooth™, a wireless technology for providing a short range radio link between various small form factor data devices, can operate at 2.45 GHz with transmission speeds of 721 Kbps. Finally, various other technologies, such as Fixed Wireless Loop, Wireless Local Loop, Local Multipoint Distribution System (LMDS) and Multichannel Multipoint Distribution System (MMDS) have be used to provide broadband access to subscribers.

The growth and gradual switch from narrowband to broadband access and services has eased user access to digital media by decreasing download time, consequently increasing user willingness to access digital media networks. This growth in network access and subscriber willingness has fueled the need to provide subscriber terminals to access the various broadband services. Typical subscriber access devices include, PCs, TVs, set-top boxes, handheld computers, wireless LAN devices, and audio devices that have the capability to download digital media content from the Internet for later playback and viewing.

Consequently, a new problem of user/subscriber control over the transmission of digital media has arisen from the development of MOD services, broadband access and the existence of a myriad of access devices, each having its own capabilities and access characteristics. Current systems lack functionality for accessing specific digital media on a first access device in a viewing session, and subsequently continuing the viewing session by allowing access of the same digital media from a second access device. For example, with present systems, a user viewing a movie delivered through a TV at home, cannot terminate the delivery of the movie only to resume the delivery of the same movie at a later time. Additionally, current systems do not permit one to resume delivery of a movie at a later time through a different access device, for example a PC. Finally, current systems do not permit the resumption of the delivery of the movie to an access device positioned in a location that differs from that in which the original access began, namely, the home. Accordingly, given the limitations and inflexibility present in current MOD systems, there exists a need to provide a more efficient and flexible system and method for providing configurable access to digital media in a MOD system.

SUMMARY OF THE INVENTION

The present invention can include a method for providing configurable access to media in a media-on-demand system. The method can include the steps of delivering the media to a first client device through a first communications link; recording a bookmark specifying a position in the media; and delivering the media to a second client device through a second communications link. Significantly, the delivery to the second client device can begin at the position specified by the recorded bookmark. The method can further include the steps of identifying device properties for each of the first and second client devices; and, delivering the media to the first and second client devices through the respectively established first and second communications links. Notably, the client device properties can include the client device type, particular media formats which can be processed by the client device and the type of communications link which can be supported by the client device.

In one aspect of the present invention, the media can be delivered to first and second client device sessions through first and second communications links respectively. Generally, in this aspect of the present invention, the first and second client device sessions can reside in a single client device. However, the invention is not limited in this regard and the first and second client device sessions can reside in first and second client devices.

Notably, the media can be delivered in a format compatible with the identified device properties. Specifically, in one aspect of the invention, the media is stored in a media-on-demand server (MODS) and delivered to the first and the second client devices via the first and the second communications link respectively. In another aspect of the invention, the step of delivering the media to the first client device via the first communications link, can include receiving the media from the MODS in an intermediate server. In the intermediate server, the media can be converted to a format compatible with the identified device properties of the first client device; and the converted media can be delivered to the first client device via the first communications link.

In another aspect of the invention, the step of delivering the media to a second client device via the second communications link can include receiving the media in an intermediate server from the MODS. In the intermediate server, the media can be converted to a format compatible with the identified device properties of the second client device. Subsequently, the converted media can be delivered to the second client device via the second communications link.

In one aspect of the present invention, the method also can include the steps of storing the media in selected ones of a plurality of media-on-demand servers. Each MODS in the plurality of media-on-demand servers can store the media in at least one format compatible with a selected device type. A MODS can be selected for delivering the media to the first client device. The selected MODS can have stored thereon the media in a format compatible with the first client device. Subsequently, the media can be delivered from the selected MODS in a format compatible with the first client device. Likewise, a MODS can be selected for delivering the media to the second client device, wherein the selected MODS has stored thereon the media in a format compatible with the second client device. Subsequently, the media can be delivered from the selected MODS in a format compatible with the second client device.

The selecting step can further include determining if a MODS is available for delivering the media to the first client device in a format compatible with the first client device. If it is determined that a MODS is not available for delivering the media to the first client device in a format compatible with the first client device, a MODS can be selected for delivering the media to the first client device. Notably, the selected MODS can contain the media in a standard format. As such, the media in the standard format can be converted to a format compatible with the first client device.

Similarly, the selecting step can further include determining if a MODS is available for delivering the media to the second client device in a format compatible with the second client device. If it is determined that a MODS is not available for delivering the media to the second client device in a format compatible with the second client device, a MODS can be selected for delivering the media to the second client device. Notably, the selected MODS can contain the media in a standard format. As such, the media in the standard format can be converted to a format compatible with the second client device.

A method for providing configurable access to media in a media-on-demand system also can include delivering the media to a first client device in a format compatible with the first client device; interrupting the delivery of the media; recording a bookmark specifying a position in the media where the interruption occurred; and resuming delivery of the media to a second client device, the resumed delivery beginning at a position in the media specified by the recorded bookmark. The method further can include identifying device properties for each of the first and second client devices; delivering the media to the first client device in a format compatible with the identified device properties for the first client device; and, delivering the media to the second client device in a format compatible with the identified device properties for the second client device.

The present invention also can include a user-controlled media-on-demand system. The system can include a media-on-demand server (MODS) for delivering media to client device sessions; a first communications link between the MODS and a first client device session; a second communications link between the MODS and a second client device session; and, a bookmark in the MODS specifying a position in the delivered media. Notably, the MODS can deliver media to the first client device session over the first communications link. Similarly, the MODS can deliver the media to the second client device session over the second communications link beginning at the position specified by the bookmark. Notably, the first and second client device sessions can reside in first and second client device sessions. Alternatively, the first and second client device sessions can reside in a single client device.

In one aspect of the invention, the system can also include an intermediate server disposed between the MODS and the client devices. In particular, the intermediate server can receive the delivered media from the MODS. Also, the intermediate server can identify device properties for each of the client devices. In consequence, the intermediate server can convert the delivered media to a media format compatible with the identified device properties for each client device. Finally, the intermediate server can deliver the converted media to the client devices.

In another aspect of the invention, the system can include a plurality of media-on-demand servers. Each MODS in the plurality of media-on-demand servers can store media in at least one format compatible with a specific device type. Also, the system can include an intermediate server which can identify a device type of a client device. In consequence, the intermediate server can select a MODS in the plurality of media-on-demand servers for delivering the media to the client device. The selected MODS can store the media in a format compatible with the identified device type. Upon being selected, the MODS can deliver the media to the client device in the format compatible with the identified device type.

In yet another aspect of the present invention, the system can further include a backup MODS for storing media in a standard format compatible with a standard device type; and, a conversion filter in the intermediate server. The intermediate server can determine if a MODS in the plurality of media-on-demand servers is available for delivering the media to the client device in a format compatible with the client device. The intermediate server also can select the backup MODS if it is determined that no MODS is available for delivering media to the client device in a format compatible with the client device. The backup MODS can deliver the media to the intermediate server in the format compatible with the identified device type. As a result, the intermediate server can convert the media to a format compatible with the identified device type in the conversion filter.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

The present invention is a user-controlled, multi-device, media-on-demand system. The media-demand-system of the present system can provide users with the ability to receive delivered media across a network in a client device through a communications link to a media-on-demand server (MODS) regardless of the properties of the client device and the characteristics of the communications link. Specifically, the MODS can deliver particular media to the client device in a format consonant with the properties of the client device which can include device type, acceptable media format and communications link speed and reliability.

Significantly, the user can interrupt the delivery of the delivered media to a client device session in a client device, and subsequently the user can resume the delivery of the delivered media in a seamless manner. Notably, the delivery can resume in a new client device session in a different client device, or in a new client device session in the same client device as the initial client device session. Additionally, the delivery can resume regardless of the timing of the resumption of the delivery and of the properties of the client device through which the user receives the resumed delivery.

Specifically, the user can resume the delivery of a previously interrupted reception of delivered media through a particular client device and a corresponding communications link each of which may have properties which differ from the client device and corresponding communications link of the interrupted delivery. Upon resumption of the delivery, the properties of the new client device can be determined and the format of the delivered media dynamically changed to accommodate the new client device. Moreover, the delivery can resume at a position in the delivered media corresponding to the position in the delivered media which had been most recently delivered to the client device prior to the interruption.

Figure 1:
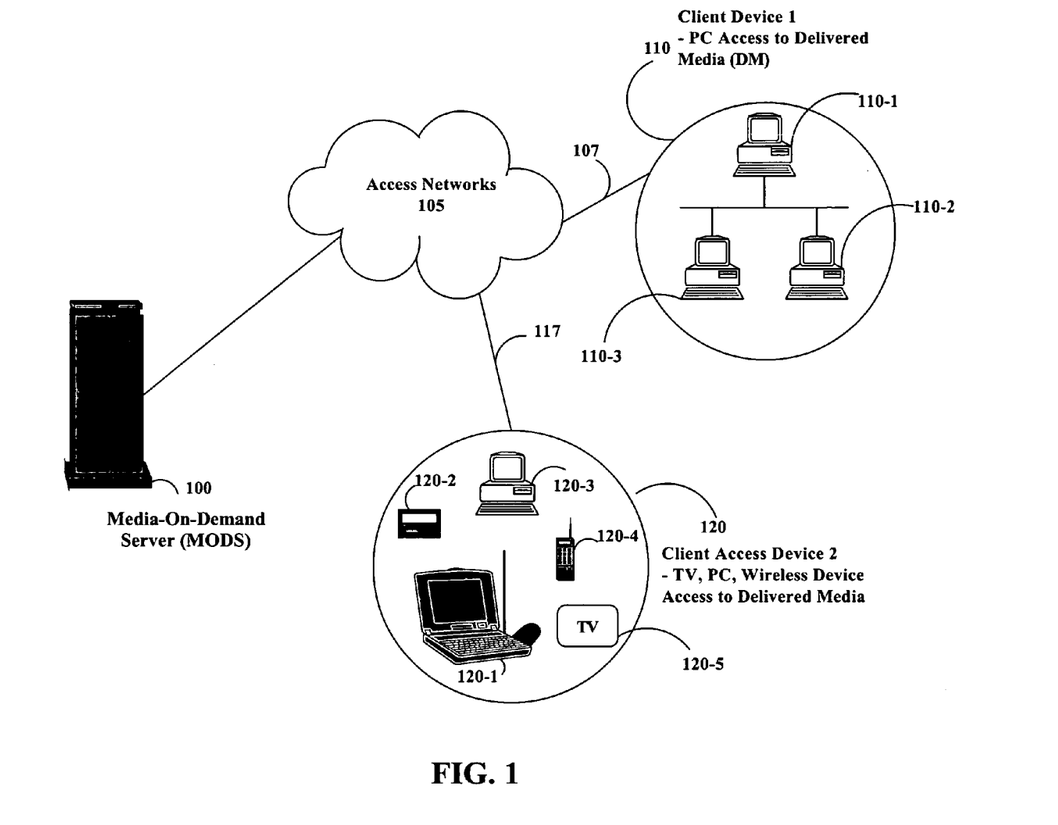
FIG. 1 is an exemplary network architecture diagram illustrating various network entities of the invention.

FIG. 1 is an exemplary network architecture diagram illustrating the various network entities of the invention in accordance with the inventive arrangements. As illustrated in the figure, the major network entities can include a MODS 100, Access Networks 105 and a first client access device 110 exemplarily illustrated as PC Access to Delivered Media consisting of computers 110-1, 110-2 and 110-3. A second client access device 120 is exemplarily illustrated as a TV, PC, Wireless Device Access to Delivered Media consisting of a laptop computer 120-1, a handheld device 120-2, a desktop computer 120-3 and a wireless telephone 120-4.

Client access devices (client devices) 110 and 120 are connected to access networks 105 via connections 107 and 117. Connections 107 and 117 may be wired or wireless connections. Typical wired connections include but are not limited to narrowband POTS, xDSL, Hybrid Fiber Coaxial (HFC) and cable, which can utilize twisted pair copper wires, coaxial cable, fiber or any combination thereof. Typical wireless connections include but are not limited to Cellular, PCS, CDPD, GPRS and Bluetooth each which typically operate at frequencies in the range of 900 MHz to 38 GHz.

The MODS 100 can be comprised of a plurality of access interfaces since it supports access by different kinds of client devices. For example, the MODS 100 can have a Ethernet interface that supports a TCP/IP stack, an X.25 interface to support communication with public data networks that utilize the X.25 protocol, or a T1 interface to support traffic from a public switched telephone network (PSTN).

In addition to supporting various access methodologies, the MODS 100 can store delivered media in a variety of formats, wherein each format is compatible with a particular type of client access device. For example, the MODS 100 may store particular delivered media in MPEG1, MPEG2, Digital Video Broadcast, Quicktime, etc. As a result, the ability to store delivered media in different formats provides the flexibility to serve delivered media to differing types of client devices.

Alternatively, the MODS 100 merely can store a single default format of the delivered media. However, when a request for delivered media is received from a client device having a particular device type, the MODS 100 can identify the device type and transcode or convert the delivered media from the default format to a format compatible with the identified client device type. For example, if the device type of client access device 120-1 can process delivered media formatted in the WML protocol, upon receiving a request for delivered media from the client access device 120-1, the MODS 100 can transcode the delivered media from the default format to WML.

In one representative embodiment of the invention, whenever a client device, for example client device 110, attempts to access delivered media services through the MODS 100, the MODS 100 can attempt to identify device type of the client device 110. In particular, the MODS 100 can send an initial query to the client device 110 requesting that the client device 110 report its device type. Alternatively, the client device 110 can transmit the device type indication with the initial access request. Hence, the client device type can be identified with a minimum of communications required.

Figure 2:
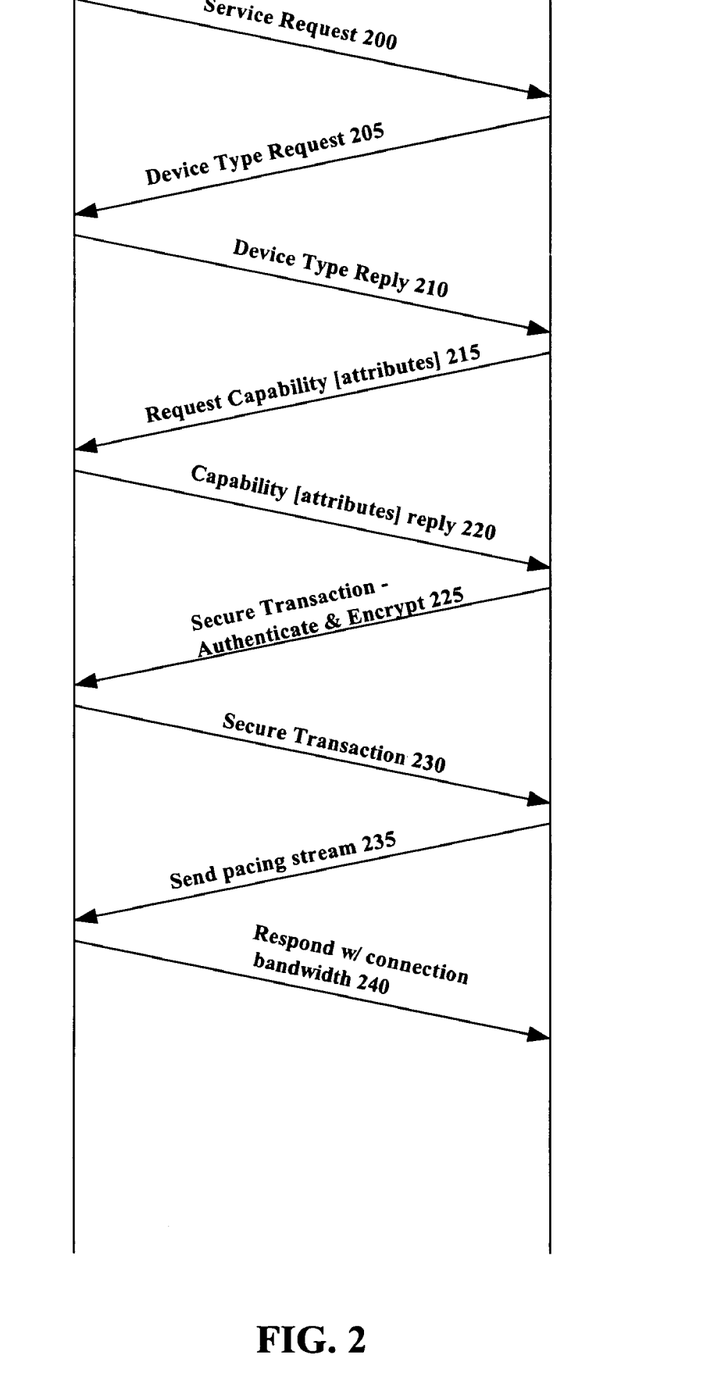
FIG. 2 is an exemplary flow diagram illustrating the messaging that occurs between a client device and a MODS in the startup process.

FIG. 2 illustrates an exemplary startup sequence between the MODS 100 and a client device 110-1. As shown in the figure, client device 110-1 can request media delivered from a MODS 100 and can issue a service request 200. MODS 100 can respond with a query 205, requesting the device type for client device 110-1. Client device 110-1 can respond with a device type reply 210. In addition to identifying the client device type, the MODS 100 can request additional information about the configuration of the client device 110-1 by issuing a capability request 215 to the client device 110-1. The client device 110-1 can report its configuration with a capability reply message 220. Alternatively, the MODS can assume a default configuration based on the device type provided in the device type reply 210.

Configuration information can include, but is not limited to screen characteristics, such as size, color or grayscale, I/O capabilities such as speakers, printer types, supported media formats and buffer size. While it might be preferable to acquire the configuration information dynamically, it should readily be understood by one skilled in the art that alternative methods are possible without departing from the spirit of the invention. For example, the client device configuration information could be acquired at the time a user subscribes to a delivered media subscription. Alternatively, the client device configuration information can be provided manually. Finally, the client device configuration information can be acquired from client device configuration data which can be pre-stored in a database and indexed according to client device type or user.

In a representative embodiment of the present invention, the client device 110-1 can have corresponding configuration information which has been pre-stored in static memory of the client device, such as a Read-Only-Memory (ROM). In consequence, the configuration information can be transferred electronically to the MODS 100 over the network 105, either at the initial access or when the client device 110-1 accesses the network 105. In the latter case, if there are changes to the client device configuration, the ROM can be reprogrammed such that the updated client device information can remain available to the MODS 100.

Returning now to FIG. 2, the delivery of media from the MODS 100 to clients 100 can be a for-fee service wherein the user pays a fee in exchange for the on-demand delivery of media content, for example a movie or song. Accordingly, for security purposes, an authentication exchange between the client device 110 and the MODS 100 can be used to facilitate access to services and billing. There are various methods that are well known in the art that can be used to authenticate and grant access to particular network services. For example, the Secured Socket Layer (SSL) protocol uses a public key cryptography to authenticate and encrypt information that is transferred over the Internet using TCP/IP. Authentication and encryption can be used to secure the transmission of transaction messages 225 and 230 which can further the goals of ensuring a secure transaction.

Due to the varied nature of the type of communication links that can be used for communication between the client device 110-1 and the MODS 100, the MODS 100 can attempt to evaluate the connection by using, for example, pacing stream 235. Hence, MODS 100 could use the pacing stream 235 consisting of a regulated stream of messages sent to client device 110-1, in order to ascertain the bandwidth of the connection. Metrics such as the arrival times and the interstitial times can be measured by the client device 110-1 and reported to the MODS 100 through a respond with bandwidth message 240. These metrics then can be used to determine network latency and the bandwidth requirements. Although the metrics can be measured by the MODS 100, in one representative embodiment, the metrics are measured by the client device 110-1.

Figure 3:
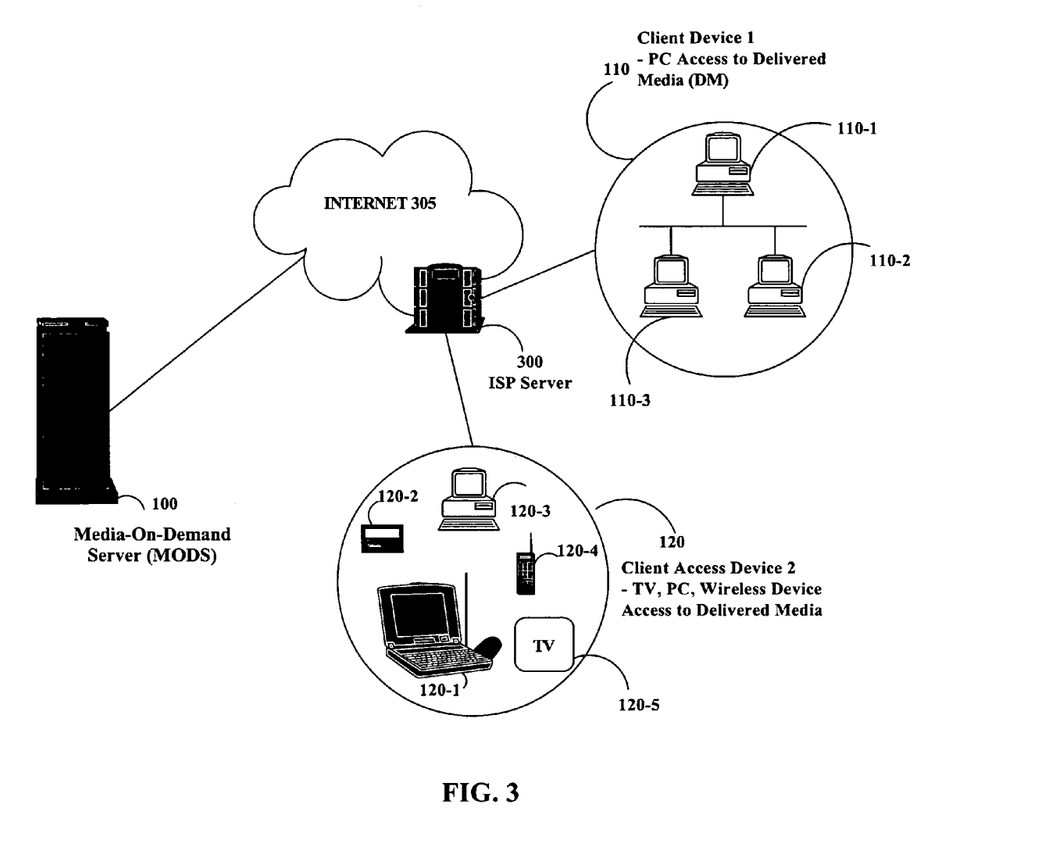
FIG. 3 illustrates an alternate network architecture for the network illustrated in FIG. 1, wherein the MODS is mediated by an ISP.

Referring now to FIG. 3, an alternative architecture to that disclosed in FIG. 1 is shown, wherein access to the MODS 100 is mediated by an ISP server 300. From a network provider perspective, the MODS 100 does not have to be the same operating entity as that of the ISP server 300. Hence, whenever the client device 110-1 attempts to access a service offered by the MODS 100, the ISP 300 can mediate the transaction. Specifically, in one embodiment of the invention, a capability exchange can precede the MODS transaction for the delivered media. During the capability exchange, the ISP 300 can query the client device 110-1 for the client device type and can mediate the transaction between the MODS 100 and the client device 110-1 according to the identified client device type. In a further aspect of the invention, since the MODS 100 can store the delivered media, the delivered media can be sent to the client device 110-1 through the ISP server 300.

Significantly, the MODS 100 can store bookmarks within the local memory of the MODS 100. The bookmarks can be used in the conventional sense inasmuch as the bookmarks can store a location in the delivered media related to a position in the delivered media which most recently had been transmitted to the client device 110-1. Notably, the bookmark does not necessarily store the position in the delivered media which had been transmitted most recently to the client device 110-1. Rather, the bookmark also can store a position preceding that position which had been most recently transmitted to the client device 110-1 so that the resumption of delivery of the delivered media at a later time can overlap the delivered media previously transmitted to the client-device 110-1.

While the MODS 100 can retain a subscriber record which can contain a bookmark indicating the subscribers delivered media history, in one embodiment of the present invention, the ISP 300 can retain the subscriber record and the MODS 100 can retain at least a partial copy of the subscriber record. One reason for this system of dual retention is that a user may have several bookmarks of which many may never be used. Notably, the several bookmarks may have been created based upon the delivery of media to a single client device or to a plurality of different client devices having differing formats. As an example, in the architecture shown in FIG. 3, since the ISP 300 provides the delivered media received from the MODS 100 to the client device 110-1, the ISP 300 maintains the subscriber record.

In a further aspect of the invention, copies of the bookmark can be stored both at the ISP 300 and at the MODS 100. In consequence, in the event the copies of the bookmark fall out of synchronization, such as can happen whenever there is a power outage during a software upgrade, then the user of a client device 110-1 can be given the option to select which copy of the bookmark is the correct copy. Once the correct version of the bookmark has been identified, the correct version can be used to overwrite the incorrect version of the bookmark. The process of updating mismatched copies of the same bookmark can be encoded in a Java applet. Specifically, when a request is made to access information in a time code field of the bookmark record stored in the ISP 300, the copy of the bookmark stored in the MODS 100 can be checked to ensure that the time code entries are the same. In the case where the time code entries are not the same, the Java applet can request that the user select the correct bookmark.

Figure 4:
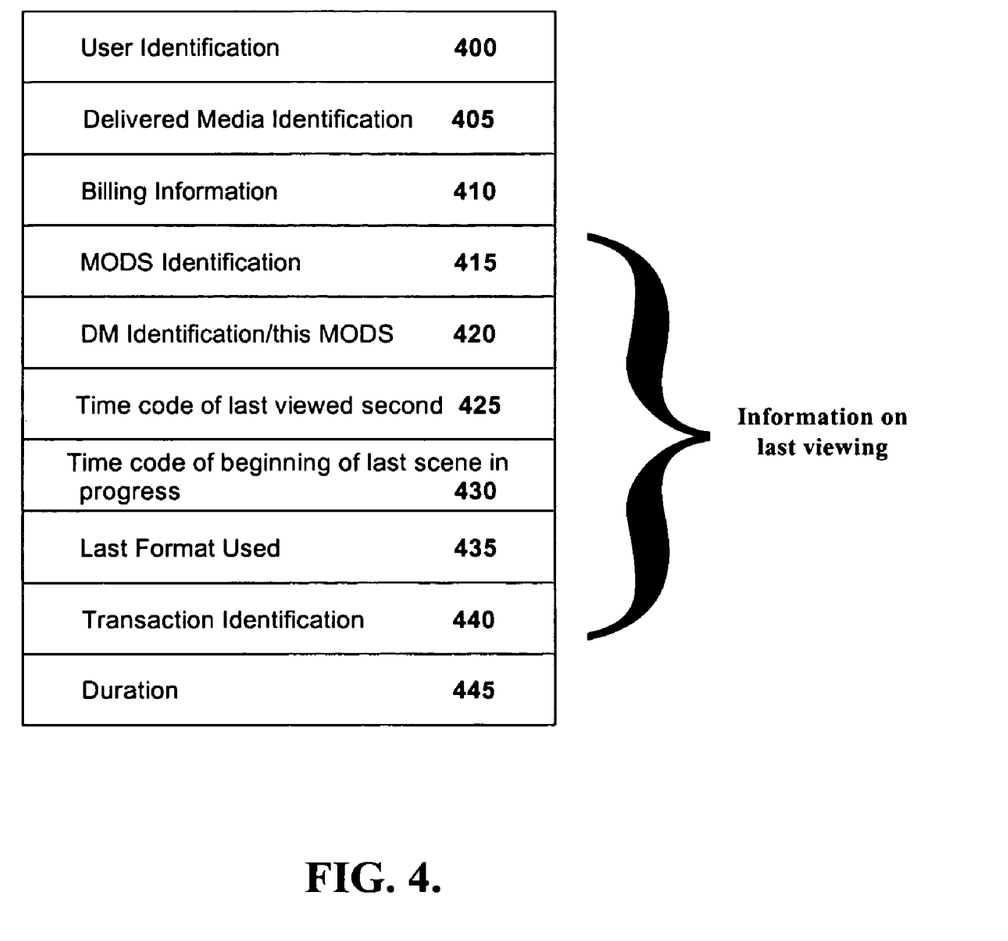
FIG. 4 illustrates the fields in an exemplary bookmark.

FIG. 4 illustrates an exemplary bookmark. Information contained in the exemplary bookmark can be categorized into three major categories—data used to uniquely identify the user 400, data used to uniquely identify the delivered media 405 and data unique to the last presentation of at least a portion of particular delivered media 410, 415, 420, 425, 430, 435, 440. Finally, the bookmark can include a duration field 445 for indicating the last viewed segment or the cumulative time for the completed portions of delivered media. Still, it should be readily understood by one skilled in the art that other information may be included without departing from the spirit of the invention. For example, the bookmark can include user device type and capability information, device type configuration data as well as other security information. If there are a number of bookmarks associated with the delivery of particular delivered media to a particular user, the entries in the table can be duplicated to represent each bookmark.

Notably, the data unique to the last presentation of at least a portion of particular delivered media can include, but is not limited to, a MODS identification 415 which can be used to identify a particular MODS from which delivered media can be transmitted to a client in a particular delivery session, a delivered media identifier 420 for identifying particular delivered media to be delivered from the current MODS, a time code 425 of the last viewed second of the delivered media, a time code 430 of the beginning of the last scene/frame/tract in progress, a last format indicator 430 which can specify the format of delivered media last delivered to a client device, for example, MPEG or WML, and a transaction identifier 440 that can be used as a reference to the current transaction between the MODS or ISP and the client device.

Figure 5:
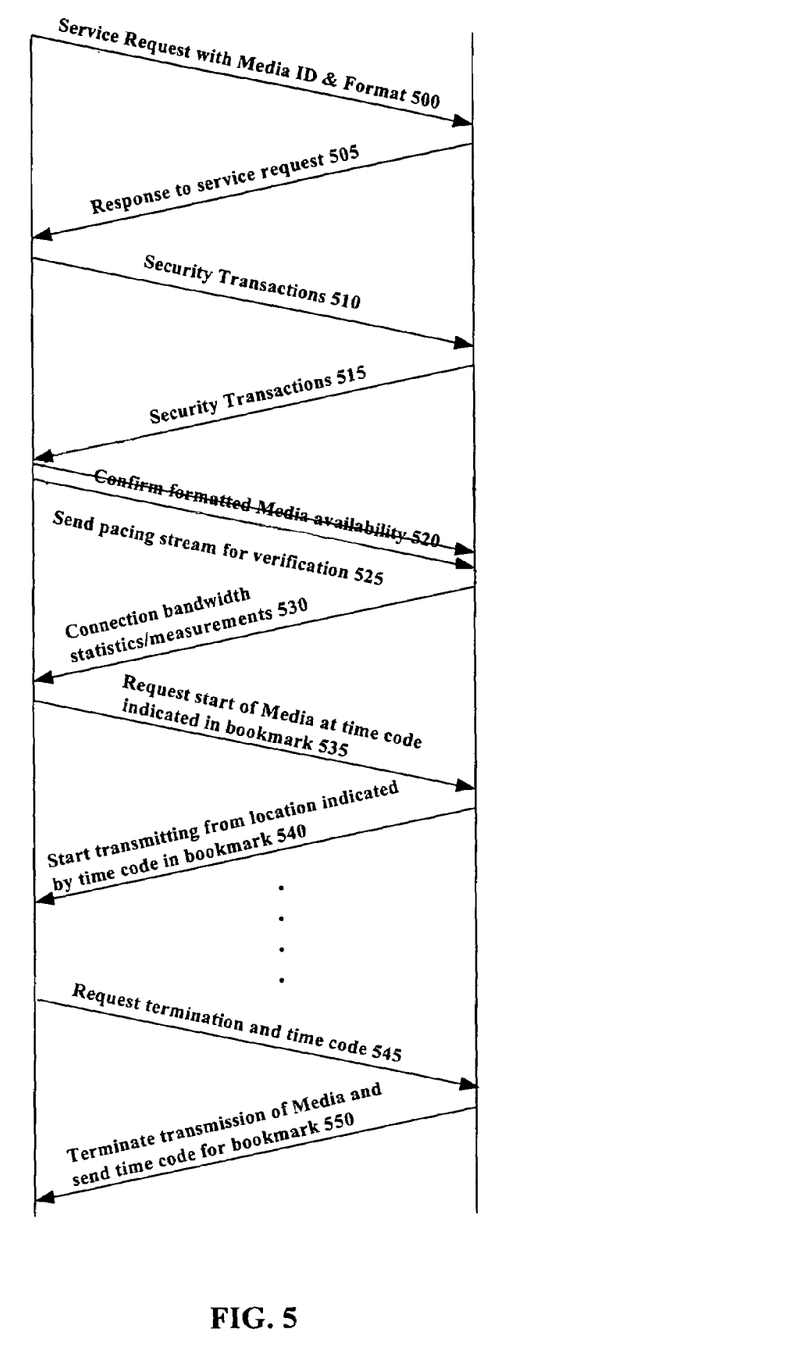
FIG. 5 is an exemplary flow diagram illustrating the messaging that occurs between a MODS and ISP.

FIG. 5 is a communication flow diagram which can illustrate the communication occurring between the MODS 100 and the ISP 300 as shown in FIG. 3. The steps used to determine the client device type and delivered media format are not shown since they are similar to that illustrated in FIG. 2, the only difference being that the determination is performed within an ISP. As shown in FIG. 5, presumably in response to a user request to receive specified delivered media, a MODS 100 can be selected to deliver the specified delivered media.

Once a MODS 100 has been selected, the ISP server 300 can issue a service request 500 to the MODS 100. The service request 500 can contain the delivered media identification and format. Subsequently, the MODS 100 can acknowledge the service request 500 with a response 505. While often it can be preferable to ensure the security of an online transaction, for example the online verification of a user identity and corresponding payment authorization as shown in steps 510 and 515, one skilled in the art will recognize that the security measures illustrated in FIG. 5 are optional.

Following the securing of the communications link in steps 510 and 515, the ISP 300 can confirm the availability of the appropriate format of the delivered media by transmitting an availability message to the MODS 100 in step 520. Additionally, in order to determine the bandwidth requirements, the ISP 300 can send a pacing message 525 to the MODS 100. In response, the MODS 100 can send to the ISP 300 a response 530 having the appropriate statistics/measurements necessary to determine the required bandwidth. Still, as one skilled in the art will recognize, steps 525 and 530 are optional and the absence of steps 525 and 530 or the addition of supplemental steps will not detract from the spirit of the invention. For instance, in an alternative embodiment, steps 525 and 530 can be periodically repeated to evaluate and dynamically adjust the bandwidth settings to ensure acceptable Quality of Service.

The ISP 300 can query a bookmark associated with the requested delivered media and the requesting user. From the queried bookmark, the ISP 300 can identify a position from which to resume (or begin as the case may be) delivery of the requested delivered media. Specifically, in step 535 the ISP 300 can request the MODS 100 to begin transmission of the delivered media at the time code indicated by the specified bookmark. After determining the particular position within the delivered media corresponding to the time code in the bookmark, the MODS 100 can resume (or begin) transmission of the delivered media as shown in step 540.

After some time has elapsed, a terminate request for terminating transmission of the delivered media can be received in the ISP 300, possibly from the client device. In response, a request for termination can be transmitted to the MODS 100 in step 545. In response, in step 550 the MODS 100 can terminate the transmission of the delivered media. Additionally, in a representative embodiment in which the ISP 300 stores the bookmark, the time code can be sent from the MODS 100 to the ISP 300. Moreover, other suitable information necessary for creating a new bookmark and for generating user charges for receiving the delivered media can be sent to the ISP 300.

Figure 6:
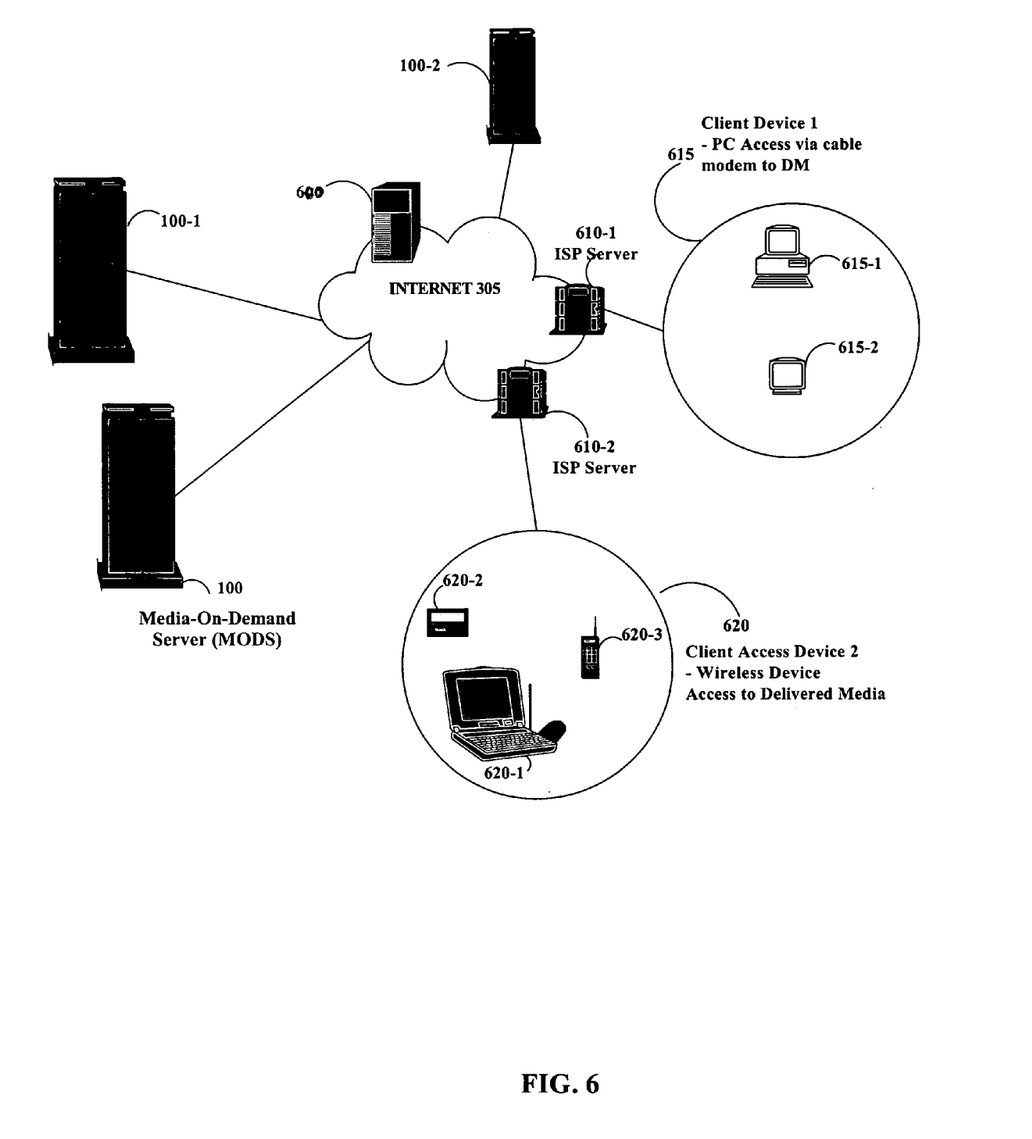
FIG. 6 illustrates is an exemplary network having a plurality of MODS and a plurality of service providers each servicing a different client device type is disclosed.

FIG. 6 illustrates a further embodiment of the invention, in which a plurality of MODS 100 can provide delivered media in various formats to a plurality of ISPs 610. Each format can be selected according to the requirements of various client device types associated with one of a plurality of requesting client devices 615, 620. Referring to FIG. 6, an exemplary network having a plurality of MODS 100 and a plurality of ISPs 610 each servicing a different client device type is disclosed. ISP 610-2 interconnects wireless client devices 620-1, 620-2 and 620-3 to the Internet 305. Similarly, ISP 610-1 interconnects client devices 615-1 and 615-2 to the Internet network 605 via a coaxial cable. In the depicted arrangement, a subscriber can have multiple devices each having its own methodology of accessing the services provided by the MODS 100 through a different ISPs 610. A plurality of MODS 100 such as MODS 100-1, 100-2 and 100-3 can be deployed within the network to more efficiently serve the ISPs 610.

Notably, an Internet Media Aggregator (IMA) 600 can be provided to store bookmarks and to facilitate the conversion of delivered media from a format compatible with one client device type to a format compatible with another client device type. Specifically, delivered media in a format compatible with a first client device type can be retrieved from the MODS 100 by the IMA 600 and dispatched to the first client device without modification. The delivered media in the MODS 100 also can be retrieved by the IMA 600 and dispatched to a second client device. With regard to the second client device however, the IMA 600 can convert the delivered media from a format compatible with the first client device type into a format compatible with the second destination device type.

For example, with reference to FIG. 6, consider the case where a user is at home and has a desire to watch an interactive video presentation on client device 615-2. Client device 615-2 can be used to access the Internet 305 via the ISP server 610-1. The interactive video presentation can be stored in the MODS 100-1 in a global format, for example MPEG-II, recognizable by the client device 615-2. ISP server 610-1 can request IMA 600 to acquire the interactive video presentation from the MODS 100-1.

Once the IMA 600 receives the video presentation, it can determine the appropriate format in which to deliver the presentation to the client device 615-2. Based upon the configuration information of client device 615-2, IMA 600 can determine that there is no need to convert the format of the presentation since the client device is capable of accepting an MPEG-11 format. Therefore, IMA 600 can deliver the video presentation to the client device 615-2 via ISP server 610-1.

However, due to prior engagements, the user may have to leave home for the airport where he/she is stranded for a few hours. Before leaving home, the user terminates the transmission of the presentation. In consequence, a bookmark of the position in the presentation where the viewing stopped can be recorded in a bookmark stored in the memory of IMA 600. Subsequently, while waiting at the airport, the user can access the network 305 via ISP server 610-2 using client device 620-1. As a result, the ISP server 610-2 can request that the IMA 600 resume the transmission of the interactive video presentation. In particular, the IMA 600 can consult the bookmark and can determine the position in the presentation which had been most recently transmitted to the user's home prior to the user's termination of the transmission.

Once the position has been determined, the IMA 600 also can determine the format compatible with the client device type of the client device 620-1. Specifically, the format can be determined from the configuration information of client device 620-1. Suppose the client device 620-1 can only accept the presentation of delivered media in QuickTime format. As such, IMA 620-1 can convert the MPEG2 format of the delivered media received from the MODS 100-1 into QuickTime format compatible with the client device 620-1. Once the conversion from MPEG2 to QuickTime is complete, IMA 600 can deliver the video presentation to the client device 620-1 via the ISP server 610-2 in a format suitable for receipt by the client device 620-1. Additionally, the IMA 610-2 can request the transmission of the presentation to begin at a point in the presentation defined by the time code field of the bookmark.

In an alternative embodiment, different formats corresponding to each of the supported device types can be stored on one or more of the servers. For example, before doing the conversion from MPEG2 to QuickTime, the IMA 600 could have queried MODS 100-2 to determine if a QuickTime format of the video presentation was already stored in the MODS 100-2. Since MODS 100-2 already had a QuickTime format copy of the presentation, the IMA 600 could have download that copy to the MODS 100-2 rather than having to perform a duplicate conversion of the presentation from MPEG2 to QuickTime.

A further embodiment of the invention can arise in the circumstance of the present example in which the user had forgotten to terminate the session at home because of an urgency to arrive at the airport by a particular time. Once the user accesses the ISP 300 from the airport using client device 620-1, the user can request that the IMA 600 terminate the session in progress with client device 615-1. Subsequently, the user can request that the IMA 600 continue the video presentation session on the client device 620-1.

Notably, since no bookmark previously existed because the user forgot to terminate the session at home, the user can be given the option of estimating a time code that can be proportional to the time of the presentation length. For example, if the video presentation was 2.5 hours (2 hrs:30 mins:00 secs), then entering a time code of 1:30:23 would correspond to a time stamp of 1 hour, 30 minutes and 23 seconds. Hence, if the user wanted to watch the last hour of the video presentation, then the user would enter 01:30:00 as the time code. In order to differentiate this time code from an actual time code, an asterisk (*) could be placed next to the time code to show that it was fictitious.

After the time code has been entered, the IMA 600 can attempt to find a QuickTime format of the video presentation stored on a MODS 100 or convert delivered media in MPEG2 format in MODS 100-1 to QuickTime format. The video presentation then can be streamed from the IMA 600 to the client device 620-1 starting from the entered time code.

A yet further embodiment of the invention can arise in the circumstance of the present example in which the user bookmarked the video presentation before leaving home but intentionally allowed the video presentation to run since someone else at home was watching the video presentation. In this case, when the user arrives at the airport, if the session at home is still in progress, the user can request that the IMA 600 create an additional stream for viewing the presentation on client device 620-1. The user can be charged for additional presentation time and the presentation can begin from the position indicated in the bookmark that the user created before leaving home.

Notably, with regard to the bookmark described herein, it should readily be understood by one skilled in the art that a bookmark does not have to represent the exact point at which the media was discontinued. To compensate for delay or other transitory loss, the bookmark may be placed at a point prior to the actual point of discontinuance of transmission. For example, using a time based bookmark reference, the bookmark may be placed at ten seconds prior to the actual point of discontinuance. Alternately, the bookmark could be placed at the point of discontinuance, and whenever resumption of the media occurs, the resumption is started at a point, for example, 10 seconds prior to the actual point of discontinuance. In addition to using relative time or location based methods for the bookmark, other schemes employing translation of the physical location or time or any combination thereof, may be utilized.

The present invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools.

The invention claimed is:

1. A method for providing configurable access to media in a media-on-demand system comprising the steps of:
    delivering the media to a first client device through a first communications link, wherein the media is configured in a format compatible with identified device properties of said first client device and said first client device is associated with a first user;
    recording a bookmark specifying a position in the media; and
    delivering the media to a second client device through a second communications link, said delivery to said second client device beginning at said position specified by said recorded bookmark, wherein the media is configured in a format compatible with identified device properties of said second client device and said second client device also is associated with said first user.

2. The method according to claim 1, further comprising the steps of:
    identifying device properties for each of said first and second client devices, device properties of said first client device being identified prior to commencing delivery of the media to said first client device and device properties of said second client device being identified prior to commencing delivery of the media to said second client device.

3. The method according to claim 2, wherein the media is stored in a media-on-demand server (MODS) and delivered to said first and said second client devices via said first and said second communications link respectively.

4. The method according claim 3, wherein said step of delivering the media to said first client device via said first communications link, comprises:
receiving the media from said MODS in an intermediate server;
in said intermediate server, converting the media to a format compatible with said identified device properties of said first client device; and
delivering said converted media to said first client device via said first communications link.

5. The method according to claim 3, wherein said step of delivering the media to a second client device via said second communications link, comprises:
receiving the media in an intermediate server from said MODS;
in said intermediate server, converting the media to a format compatible with said identified device properties of said second client device; and
delivering said converted media to said second client device via said second communications link.

6. The method according to claim 3, further comprising:
storing the media in selected ones of a plurality of media-on-demand servers, each MODS in said plurality of media-on-demand servers storing the media in at least one format compatible with a selected device type;
selecting a MODS for delivering the media to said first client device, said selected MODS having stored thereon the media in a format compatible with said first client device; and
delivering from said selected MODS the media in a format compatible with said first client device.

7. The method according to claim 6, wherein said selecting step further comprises:
determining if a MODS is available for delivering the media to said first client device in a format compatible with said first client device;
if it is determined that a MODS is not available for delivering the media to said first client device in a format compatible with said first client device, selecting a MODS for delivering the media to said first client device, said selected MODS containing the media in a standard format, and converting the media in said standard format to a format compatible with said first client device.

8. The method according claim 3, further comprising:
storing the media in selected ones of a plurality of media-on-demand servers, each MODS in said plurality of media-on-demand servers storing the media in at least one format compatible with a selected device type;
selecting a MODS for delivering the media to said second client device, said selected MODS having stored thereon the media in a format compatible with said second client device; and
delivering from said selected MODS the media in a format compatible with said second client device.

9. The method according to claim 8, wherein said selecting step further comprises;
determining if a MODS is available for delivering the media to said second client device in a format compatible with said second client device;
if it is determined that a MODS is not available for delivering the media to said second client device in a format compatible with said second client device, selecting a MODS for delivering the media to said second client device, said selected MODS containing the media in a standard format, and converting the media in said standard format to a format compatible with said second client device.

10. A method for providing configurable access to media in a media-on-demand system comprising:
delivering the media to a first client device in a first format compatible with said first client device, wherein said first client device is associated with a first user;
interrupting said delivery of said media;
recording a bookmark specifying a position in the media when said interruption occurred; and
resuming delivery of the media to a second client device in a second format compatible with said second client device, said resumed delivery beginning at a position in the media specified by said recorded bookmark, wherein said second client device also is associated with said first user.

11. The method according to claim 10, further comprising the steps of:
identifying a device type for each of said first and second client devices;
delivering the media to said first client device in said first format, said first format selected based upon said identified device type for said first client device; and,
delivering the media to said second client device in said second format, said second format selected based upon said identified device type for said second client device.

* * * * *